J. WEST.
Car-Coupling.

No. 160,133.

Patented Feb. 23, 1875.

Witnesses.
F. B. Townsend.
Will H Moton

Inventor.
John West
per attys.
A. H. Evans &Co.

UNITED STATES PATENT OFFICE.

JOHN WEST, OF MINNEAPOLIS, MINNESOTA.

IMPROVEMENT IN CAR-COUPLINGS.

Specification forming part of Letters Patent No. 160,133, dated February 23, 1875; application filed December 15, 1874.

*To all whom it may concern:*

Be it known that I, JOHN WEST, a resident of the city of Minneapolis, county of Hennepin and State of Minnesota, have invented certain new and useful Improvements in Car-Coupling Device, of which the following is a clear, full, and exact description, reference being had to the accompanying drawings, which are a part of this specification.

Figure 1:
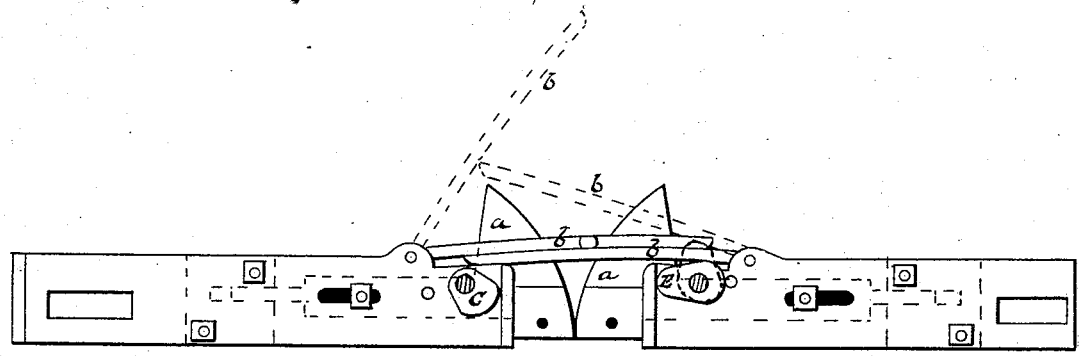
Figure 2:
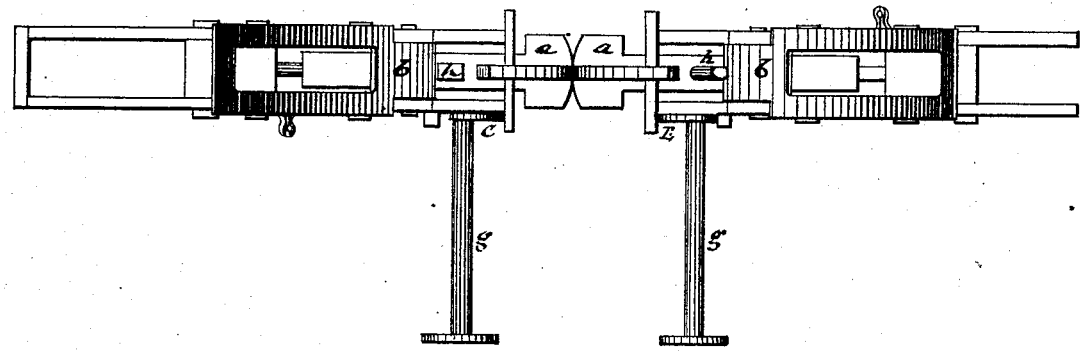

Figure 1 is a side view, and Fig. 2 a top view.

The letters of reference are used in both figures in the designation of identical parts.

The following description will enable others skilled in the art to make and use my invention.

The piece $a$ is formed in the shape shown in Fig. 1, and works in the ordinary draw-head. The upper and outer projecting part is rounded on its outer face, so as to permit the clevis-link $b$ to slide over and hook in its inner face, which may be slightly concave, so that it may the better retain the link $b$. The links $b\ b$ are used upon each bumper, and, when in place over the projecting hooks, give a double security, it making no difference which link attempts to gain the position first, the other falling in proper position. The lever-rods $g$, by the aid of their attached cams $c$ and $e$, are used to uncouple the links.

In Fig. 2 are shown the trips $h\ h$, fixed to the inner portion of the hooked piece $a$, and used to trip the clevis-link $b\ b$ when the draw-heads meet.

The object of my invention is to produce an automatic car-coupler with attached devices for uncoupling, so as to avoid the necessity for persons entering between the cars to either couple or uncouple.

Having thus described my invention, what I claim, and wish to secure by Letters Patent, is—

The independently-acting piece $a$, in combination with the clevis-link $b$, uncoupling devices $g\ e$, and trips $h$, substantially as and for the purpose specified.

JOHN WEST.

Witnesses:
F. M. COMSTOCK,
D. S. WILMOT.